United States Patent
Hattori et al.

(10) Patent No.: US 10,396,621 B2
(45) Date of Patent: Aug. 27, 2019

(54) ELECTRIC COMPRESSOR

(71) Applicant: KABUSHIKI KAISHA TOYOTA JIDOSHOKKI, Kariya-shi, Aichi-ken (JP)

(72) Inventors: Yuya Hattori, Aichi-ken (JP); Kunihisa Matsuda, Aichi-ken (JP); Hiroki Nagano, Aichi-ken (JP); Atsuhiro Ishida, Aichi-ken (JP); Tomohiko Sugiyama, Aichi-ken (JP); Takuro Yamashita, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 105 days.

(21) Appl. No.: 15/426,500

(22) Filed: Feb. 7, 2017

(65) Prior Publication Data

US 2017/0229943 A1    Aug. 10, 2017

(30) Foreign Application Priority Data

Feb. 8, 2016  (JP) .................................. 2016-021615

(51) Int. Cl.
*H02K 5/12* (2006.01)
*H02K 5/22* (2006.01)
(Continued)

(52) U.S. Cl.
CPC ............ *H02K 5/225* (2013.01); *F01C 21/02* (2013.01); *F01C 21/10* (2013.01); *F04B 35/04* (2013.01);
(Continued)

(58) Field of Classification Search
CPC .......... F04C 2240/803; F04C 2240/808; F04C 2240/40; F04C 2240/403; F04C 18/00;
(Continued)

(56) References Cited

U.S. PATENT DOCUMENTS 2,781,463 A * 2/1957 Sprando ............... H02K 5/10
                                                310/71
4,684,774 A * 8/1987 Dibbern, Jr. ............ H01H 9/06
                                                200/275
(Continued)

FOREIGN PATENT DOCUMENTS

CN      102734160 A     10/2012
DE   102012022292 A1 *   5/2013   ......... H02K 11/0094
(Continued)

OTHER PUBLICATIONS

Machine Translation of DE 102012022292, 2013.*

*Primary Examiner* — Christopher S Bobish
(74) *Attorney, Agent, or Firm* — Sughrue Mion, PLLC

(57) ABSTRACT

An electric compressor includes a compression mechanism that compresses refrigerant, an electric motor that drives the compression mechanism, a drive circuit that drives the electric motor, a housing that forms therein a motor chamber in which the electric motor is accommodated, a cover that is attached to the housing, a rotary shaft, and a relay terminal portion. The cover is configured to cooperate with the housing to form a drive circuit chamber in which the drive circuit is accommodated. Rotation of the electric motor is transmitted to the compression mechanism through the rotary shaft. The relay terminal portion provides electrical connection between a wire of the drive circuit and a wire of the electric motor. The housing includes a partition wall that separates the motor chamber and the drive circuit chamber from each other. The relay terminal portion is disposed between the partition wall and the rotary shaft.

5 Claims, 4 Drawing Sheets

(51) Int. Cl.
*H02K 7/14* (2006.01)
*F01C 21/02* (2006.01)
*F01C 21/10* (2006.01)
*F04B 35/04* (2006.01)
*F04B 39/12* (2006.01)
*F04C 18/02* (2006.01)
*F04C 18/34* (2006.01)
*F04C 23/00* (2006.01)
*F04C 29/00* (2006.01)
*H02K 11/33* (2016.01)

(52) U.S. Cl.
CPC .......... *F04B 39/121* (2013.01); *F04C 23/008* (2013.01); *F04C 29/0085* (2013.01); *H02K 5/22* (2013.01); *H02K 11/33* (2016.01); *F04C 18/0215* (2013.01); *F04C 18/34* (2013.01); *F04C 2240/40* (2013.01); *F04C 2240/403* (2013.01); *F04C 2240/803* (2013.01); *F04C 2240/808* (2013.01); *H02K 5/12* (2013.01); *H02K 7/14* (2013.01)

(58) Field of Classification Search
CPC ........... F04C 18/02; F04C 18/08; H02K 5/22; H02K 5/225; H02K 11/33
See application file for complete search history.

(56) References Cited

U.S. PATENT DOCUMENTS

| | | | |
|---|---|---|---|
| 6,278,207 B1* | 8/2001 | Matsumoto | F04D 29/083 310/68 R |
| 9,011,112 B2* | 4/2015 | Tanahashi | F04D 5/002 310/71 |
| 2011/0020153 A1 | 1/2011 | Murakami | |
| 2011/0217191 A1* | 9/2011 | Fujimra | F04B 39/121 417/410.1 |
| 2012/0230851 A1 | 9/2012 | Fukasaku et al. | |
| 2012/0251355 A1 | 10/2012 | Fukasaku | |
| 2014/0322048 A1 | 10/2014 | Inagaki et al. | |

FOREIGN PATENT DOCUMENTS

| | | |
|---|---|---|
| JP | 03-281993 A | 12/1991 |
| JP | 2002-098054 A | 4/2002 |
| JP | 2003-097435 A | 4/2003 |
| JP | 2006-042409 A | 2/2006 |
| JP | 2009-264172 A | 11/2009 |
| JP | 2010-059809 A | 3/2010 |
| JP | 2012-082719 A | 4/2012 |
| JP | 2012-184752 A | 9/2012 |
| JP | 2012-215090 A | 11/2012 |
| JP | 2016-217291 A | 12/2016 |
| KR | 10-2014-0127774 A | 11/2014 |
| WO | 2013/000528 A1 | 1/2013 |

* cited by examiner

ELECTRIC COMPRESSOR

BACKGROUND OF THE INVENTION

The present invention relates to an electric compressor, and more particularly to an electric compressor in which an inverter is integrated.

Japanese Unexamined Patent Application Publication No. 2012-184752 discloses an electric compressor which has been made to prevent a short circuit between terminal pins as hermetic terminal and a terminal holder or a housing.

The electric compressor disclosed in the above Publication includes a housing, a compression mechanism and an electric motor that are accommodated in the housing. The compressor further includes an inverter housing that is fixed to a part of the outer peripheral surface of the housing thereby to form an inverter accommodating chamber in which an inverter is provided. A hermetic terminal is electrically connected to the inverter through a connector of the inverter. Furthermore, in the housing, the hermetic terminal is electrically connected via a cluster block to a lead wire that is drawn out from a coil of the stator of the electric motor.

Various types of electric compressors are disclosed in Japanese Unexamined Patent Application Nos. 2006-42409, 2009-264172, 2010-59809, 2002-98054, 2003-97435, H03-281993, and 2012-215090.

As disclosed in Japanese Unexamined Patent Application Publication No. 2012-184752, an electric compressor having an inverter integrated therewith is known. In the electric compressor disclosed in the Publication No. 2012-184752, a cluster block is employed as a relay terminal portion for providing electric connection between the inverter and the electric motor. However, the dimensions of the housing in which a compression mechanism and an electric motor are accommodated, or the size of the electric compressor itself may be increased depending on the installation location of the relay terminal portion.

The present invention which has been made in view of the circumstances above is directed to providing an electric compressor of a smaller size.

SUMMARY OF THE INVENTION

In accordance with an aspect of the present invention, there is provided an electric compressor including a compression mechanism that compresses refrigerant, an electric motor that drives the compression mechanism, and a drive circuit that drives the electric motor, The electric compressor further includes a housing that forms therein a motor chamber in which the electric motor is accommodated, and a cover that is attached to the housing, a rotary shaft, and a relay terminal portion. The cover is configured to cooperate with the housing to form a drive circuit chamber in which the drive circuit is accommodated. Rotation of the electric motor is transmitted to the compression mechanism through the rotary shaft. The relay terminal portion provides electrical connection between a wire of the drive circuit and a wire of the electric motor. The housing includes a partition wall that separates the motor chamber and the drive circuit chamber from each other. The relay terminal portion is disposed between the partition wall and the rotary shaft.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
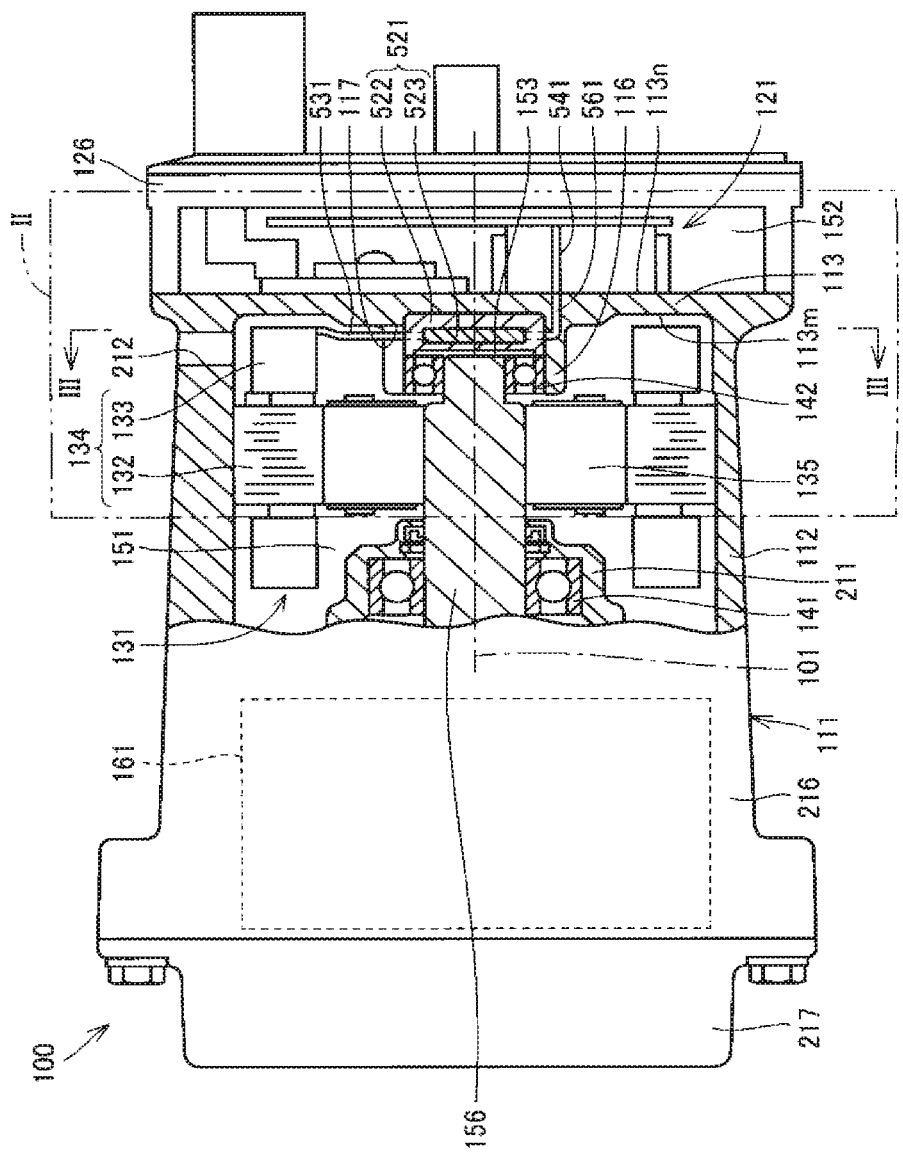
FIG. 1 is a partially cross-sectional cutaway view showing the entire structure of an electric compressor according to an embodiment of the present invention.

An embodiment of the present invention will now be described with reference to accompanying drawings. It is to be noted that each reference numeral is used to designate the same or similar components or parts throughout the description and the drawings.

Figure 2:
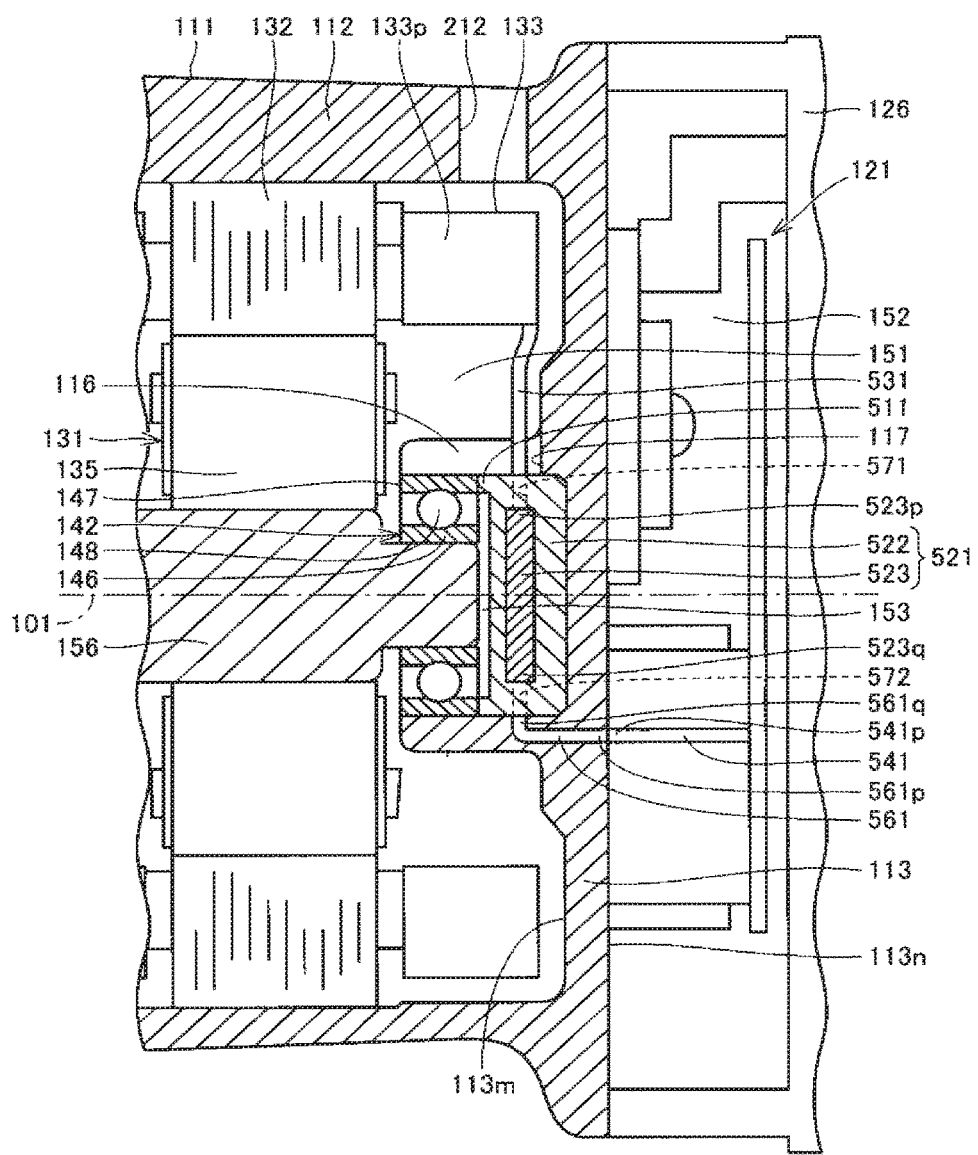
FIG. 2 is an enlarged cross-sectional view showing a part of the compressor of FIG. 1 enclosed by the two-dot chain line II.

FIG. 1 is a partially cross-sectional view showing the entire structure of an electric compressor 100 according to the present embodiment of the present invention. FIG. 2 is an enlarged cross-sectional view showing a part of the electric compressor 100 of FIG. 1 enclosed by the two-dot chain line II. The electric compressor 100 is of a type that is mounted on a vehicle and used for an air conditioning system of the vehicle.

The electric compressor 100 may be mounted, for example, on a hybrid vehicle that is driven by an internal combustion engine, such as a gasoline engine and a diesel engine, and electric power supplied from a battery. Alternatively, the electric compressor 100 may be mounted on an electric vehicle or a fuel cell vehicle.

The electric compressor 100 is connected to an engine and is mounted in an engine compartment of the vehicle. Alternatively, the electric compressor 100 may be mounted to a stay or any other suitable part provided in the engine compartment.

The electric compressor 100 includes a compression mechanism 161, a rotary shaft 156, a bearing 141, a bearing 142, an electric motor 131, a housing 111, an inverter 121, an inverter cover 126, a cluster block 521, a wire 531 for the electric motor 131, a wire 541 for the inverter 121, a hermetic terminal 561, and a shaft support portion 211.

The housing 111 is generally of a cylindrical shape (specifically, a circular cylindrical shape). An intake port 212 is formed in the housing 111 for taking in refrigerant gas from an external refrigeration circuit (not shown) constituting an air conditioning system of the vehicle. The housing 111 includes a suction housing member 216 that is of a bottomed cylindrical shape having an opening at one end thereof. The housing 111 further includes a discharge housing member 217 having therein a discharge port (not shown) connected to the external refrigeration circuit and through which refrigerant gas is discharged. The discharge housing member 217 is coupled to the open end of the suction housing member 216.

The suction housing member 216 includes a partition wall 113 and a peripheral wall 112 that extends axially from the outer periphery of the partition wall 113. The intake port 212 is located at a position in the peripheral wall 112 of the suction housing member 216 adjacent to the partition wall 113.

The partition wall 113 of the suction housing member 216 includes a boss 116 that extends axially toward the electric motor 131. Specifically, the boss 116 extends in the direction in which the peripheral wall 112 extends from the partition wall 113.

The boss 116 according to the present embodiment has a cylindrical shape having a cutout portion 117.

The compression mechanism 161 is disposed at a position in the suction housing member 216 that is closer to the discharge housing member 217 than to the intake port 212. The compression mechanism 161 includes therein a compression chamber to which refrigerant gas that is taken in the suction housing member 216 through the intake port 212 is introduced. With the rotation of the rotary shaft 156, the compression mechanism 161 is operated to perform compression. The specific types of the compression mechanism 161 include, but not limited to, a scroll type, a piston type, and a vane type.

The rotary shaft 156 extends along an axis of rotation 101 about which the electric motor 131 rotates. The rotary shaft 156 is disposed radially inward of the boss 116 in the suction housing member 216. The rotary shaft 156 is rotatably supported in the suction housing member 216, specifically by the boss 116 through the bearing 142 mounted in the boss 116 and by the shaft support portion 211 through the bearing 141 mounted in the shaft support portion 211, respectively. The rotary shaft 156 and the electric motor 131 are coaxial with each other and rotatable about the axis of rotation 101. The rotary shaft 156 is connected at a first end thereof (or the end that is adjacent to the discharge housing member 217) to the compression mechanism 161, and at a second end thereof (or the end that is adjacent to the partition wall 113) to a rotor 135 of the electric motor 131, which will be described later. Rotation of the electric motor 131 is transmitted to the compression mechanism 161 through the rotary shaft 156.

The electric motor 131 drives to rotate the rotary shaft 156 to thereby drive the compression mechanism 161. The electric motor 131 includes the aforementioned rotor 135 and a stator 134. The rotor 135 and the stator 134 are radially spaced from each other.

According to the present embodiment, the rotor 135 is fixed on the rotary shaft 156. The stator 134 includes a stator core 132 and a coil 133. The stator core 132 is fixed to the inner peripheral surface of the suction housing member 216. The coil 133 is wound about teeth (not shown) of the stator core 132 so as to form coil ends 133$p$ that protrude from the both end surfaces of the stator core 132 in the axial direction of the rotary shaft 156.

The suction housing member 216 defines a motor chamber 151 for accommodating therein the electric motor 131.

The bearing 141 and the bearing 142 are spaced axially from each other. The rotary shaft 156 contacts at the first end thereof with the bearing 141 and at the second end thereof with the bearing 142. In other words, the bearings 141 and 142 are disposed so that the rotor 135 is disposed therebetween in the axial direction of the rotary shaft 156.

The bearing 141 is disposed between the rotary shaft 156 and the shaft support portion 211. The bearing 142 is disposed between the rotary shaft 156 and the boss 116. In other words, the bearing 142 is disposed in the boss 116.

Although the bearings 141 and 142 according to the present embodiment are ball bearings, the type of the bearings 141 and 142 is not limited thereto.

The inverter cover 126 according to the present embodiment is generally of a cylindrical shape (specifically, a circular cylindrical shape). The partition wall 113 has on one side thereof a surface 113$m$ facing the electric motor 131 and on the other side thereof a surface 113$n$, respectively. The inverter cover 126 is connected at the open end thereof to the surface 113$n$ of the housing 111. The housing 111 and the inverter cover 126 cooperate to form the general contour of the electric compressor 100. The inverter cover 126 and the housing 111 cooperate to define a drive circuit chamber 152 for accommodating the inverter 121.

Specifically, the partition wall 113 of the suction housing member 216 separates the motor chamber 151 and the drive circuit chamber 152 from each other.

The inverter 121, which corresponds to the drive circuit of the present invention, is operable to convert externally input DC power to AC power and applies the AC power to the electric motor 131. The inverter 121 includes a circuit board on which an inverter circuit is formed, and electronic components such as a capacitor, and various wires.

The compression mechanism 161, the electric motor 131, and the inverter 121 are arranged in the axial direction of the rotary shaft 156. Specifically, the electric motor 131 is located between the compression mechanism 161 and the inverter 121 in the axial direction of the rotary shaft 156.

The cluster block 521, which corresponds to the relay terminal portion of the present invention, provides electrical connection between the wire 541 of the inverter 121 and the wire 531 of the electric motor 131.

The cluster block 521 includes an insulative body portion 522 having a generally disc shape and a conductive connection terminal 523 embedded in the body portion 522.

The body portion 522 of the cluster block 521 has a first insertion hole through which part of the wire of the electric motor 131 or of a conductive member that is electrically connected with the wire of the electric motor 131 is inserted. The body portion 522 further has a second insertion hole through which part of the wire of the inverter 121 or of a conductive member that is electrically connected with the wire of the inverter 121 is inserted, respectively.

According to the present embodiment, the cluster block 521 has a first insertion hole 571 through which the wire 531 of the electric motor 131 is inserted. The cluster block 521 further has a second insertion hole 572 through which the hermetic terminal 561 that is connected with the wire of the inverter 121 is inserted.

The wire 531 of the electric motor 131 is inserted in the first insertion hole 571 of the cluster block 521 and connected to a first end 523$p$ of the connection terminal 523. Subsequently, the wire 531 that is in connection with the connection terminal 523 is fitted into the cutout portion 117 of the boss 116.

An end 541$p$ of the wire 541 extending from the inverter 121 is connected to a first end 561$p$ of the hermetic terminal 561 as the conductive member. The hermetic terminal 561 has a second end 561$q$ that is connected to a second end 523$q$ of the connection terminal 523. Specifically, the wire 531 of the electric motor 131 and the wire 541 of the inverter 121 are electrically connected to each other through the hermetic terminal 561 and the connection terminal 523.

The arrangement of the cluster block 521 is arranged will now be described in detail.

The cluster block 521 is disposed between the partition wall 113 of the suction housing member 216 and the rotary shaft 156. According to the present embodiment, the cluster block 521 is disposed at a position where at least a part of the cluster block 521 overlaps with the bearing 142. Specifically, the cluster block 521 is disposed in an accommodating space 153 that is defined by the partition wall 113 of the suction housing member 216, the rotary shaft 156, the bearing 142, and the boss 116. Additionally, the cluster block 521 is arranged relative to the coil end 133*p* at such an axial position that at least a part of the cluster block 521 overlaps with the coil end 133*p* at the axial position when viewed in the radial direction of the rotary shaft 156.

In the case of a configuration in which the cluster block 521 is disposed at a position that is radially outward of the stator 134, the size of the housing may be increased in the radial direction. In contrast to this, according to the configuration of the present embodiment in which the cluster block 521 is disposed radially inward of the stator 134 and between the partition wall 113 and the rotary shaft 156, an increase in size of the housing in the radial direction may be prevented.

Furthermore, in the case of a configuration in which the cluster block 521 is disposed completely axially outward of the stator 134, or located at a position where the cluster block 521 does not overlap with the stator 134 in the axial direction of the rotary shaft 156, the size of the housing increased in the axial direction. In contrast to this, according to the present embodiment in which the cluster block 521 is disposed at an axial position where at least a part of the cluster block 521 overlaps with the coil end 133*p* when viewed in the radial direction of the rotary shaft 156, an increase of the size of the housing in the axial direction may be is prevented.

The following will describe in more detail the cluster block 521 and the bearing 142 according to the present embodiment.

The cluster block 521 has a projection 511. The projection 511 extends in the axial direction of the rotary shaft 156 from the outer periphery of the end surface of the cluster block 521 facing the bearing 142.

The bearing 142 according to the present embodiment is a ball bearing. The bearing 142 includes an inner race 146, balls 148 as the rolling elements, and an outer race 147. The inner race 146 is in contact with the rotary shaft 156. The balls 148 are disposed between the inner race 146 and the outer race 147.

The cluster block 521 is in contact at the projection 511 thereof with the outer race 147 of the bearing 142. The cluster block 521 is also in contact on the side thereof opposite to the projection 511 with the partition wall 113. Thus, the cluster block 521 is disposed between the bearing 142 and the partition wall 113.

With the projection 511, the cluster block 521 is disposed so as not to be in contact with the inner race 146 of the bearing 142 that rotates with the rotary shaft 156.

With the above configuration, the cluster block 521 is prevented by the bearing 142 and the partition wall 113 from moving in the axial direction of the rotary shaft 156. The cluster block 521 may be prevented from being displaced in the housing with a simple structure using no special positioning member, such as a claw, for the cluster block 521. Therefore, the configuration of the cluster block 521 is simplified, which helps to reduce the manufacturing cost.

It is to be noted that other component may be interposed between the cluster block 521 and the bearing 142. The cluster block 521 may be provided such that the cluster block 521 is free from contact with the partition wall 113 and/or the bearing 142 before the electric compressor 100 starts its operation. Even in such configuration, as long as the connection terminal 523 in the cluster block 521 and the hermetic terminal 561 are fixed together, the cluster block 521 is prevented from moving in the housing.

In the case of the above-described configuration in which the cluster block 521 is provided free from contact with the partition wall 113 and/or the bearing 142, the cluster block 521 may be movable in the housing before the connection terminal 523 and the hermetic terminal 561 are fixed together. In order to prevent such movement of the cluster block 521, it may be so configured that the cluster block 521 is prevented from moving by use of a conductive member electrically connected with the wire of the inverter 121 or a wire of the electric motor 131, or a conductive member electrically connected with the wire of the electric motor 131, which will be described in detail later part hereof.

Alternatively, the contact between the cluster block 521 and the partition wall 113 and/or the bearing 142 may be prevented by fixing the cluster block 521 in the boss 116 by press-fitting or in any other suitable way.

First and second modifications of the structure of the present invention in that movement of the cluster block 521 is prevented by using the wire of the electric motor 131 will now be described with reference to FIGS. 3 to 5.

Figure 3:
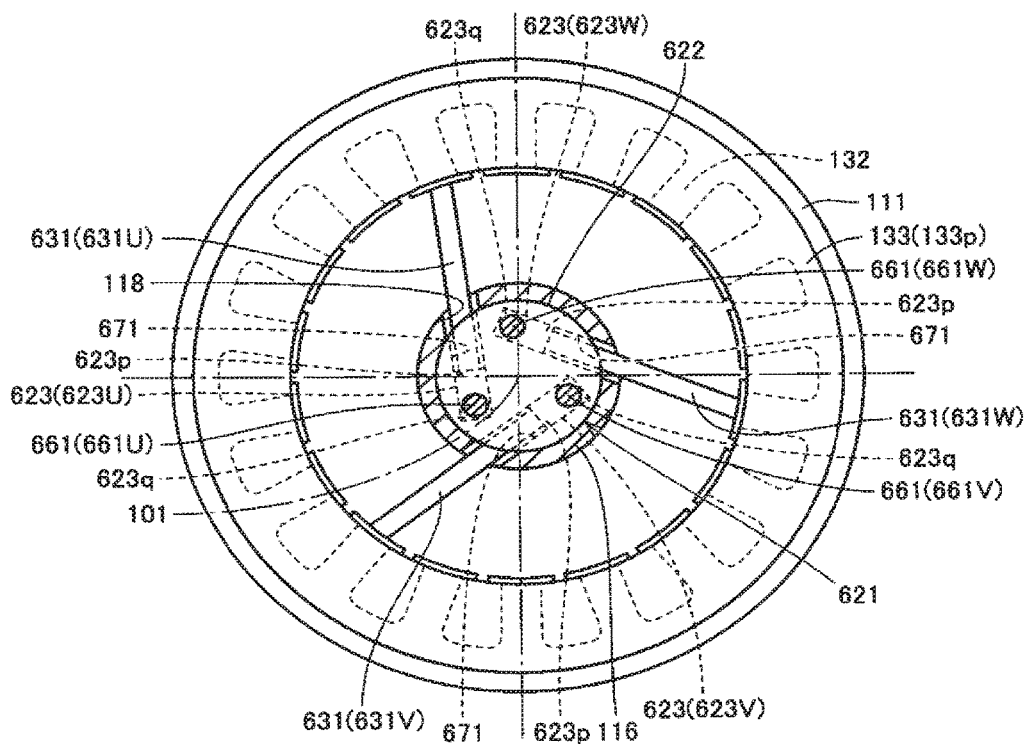
FIG. 3 is a cross-sectional view of a first modification of a structure in that the movement of a cluster block is restricted according to the embodiment of the present invention.

FIG. 3 is a cross-sectional view taken along line III-III of FIG. 1, showing a first modification of the structure that prevents the movement of the cluster block. FIG. 4 is a side cross-sectional view showing the first modification.

Figure 4:
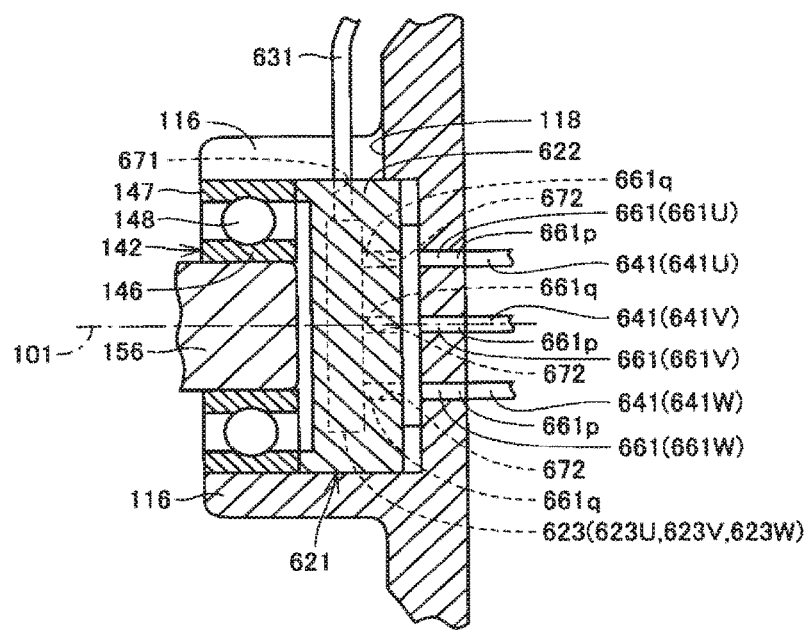
FIG. 4 is a side cross-sectional view of the first modification of the structure in that movement of the cluster block of FIG. 3 is restricted according to the embodiment of the present invention.

Referring to FIGS. 3 and 4, the boss 116 according to the first modification is cylindrical and has three cutout portions 118 spaced at regular angular intervals along the circumference of the rotary shaft 156.

Furthermore, a body portion 622 of a cluster block 621 of the first modification has three first insertion holes 671 that are shaped at regular angular intervals along the circumference of the rotary shaft 156.

A wire 631 of the electric motor 131 includes a lead wire 631U, a lead wire 631V, and a lead wire 631W that correspond to the U-phase, the V-phase, and the W-phase of the electric motor 131, respectively.

A connection terminal 623 includes a connection terminal 623U, a connection terminal 623V, and a connection terminal 623W that correspond to the U-phase, the V-phase, and the W-phase, respectively, of the electric motor 131.

The lead wires 631U, 631V, and 631W are inserted in their respective corresponding first insertion holes 671 and connected to their respective corresponding first ends 623*p* of the connection terminal 623. The lead wires 631U, 631V, and 631W are connected to the connection terminals 623U, 623V, and 623W, respectively, and then inserted in the respective cutout portions 118.

A hermetic terminal 661 includes a hermetic terminal 661U, a hermetic terminal 661V, and a hermetic terminal 661W that correspond to the U-phase, the V-phase, and the W-phase, respectively, of the electric motor 131.

A wire 641 of the inverter 121 include a lead wire 641U, a lead wire 641V, and a lead wire 641W that correspond to the U-phase, the V-phase, and the W-phase, respectively, of the electric motor 131. The lead wire 641U and a first end 661*p* of the hermetic terminal 661U are electrically connected to each other; the lead wire 641V and a first end 661*p* of the hermetic terminal 661V are electrically connected to each other; and the lead wire 641W and the first end 661*p* of the hermetic terminal 661W are electrically connected to each other.

A second end 661*q* of the hermetic terminal 661U is inserted in a second insertion hole 672 of the cluster block 621 and connected to a second end 623*q* of the connection terminal 623U; a second end 661*q* of the hermetic terminal 661V is inserted in a second insertion hole 672 of the cluster block 621 and connected to a second end 623*q* of the connection terminal 623V; and a second end 661*q* of the hermetic terminal 661W is inserted in a second insertion hole 672 of the cluster block 621 and connected to a second end 623*q* of the connection terminal 623W.

According to the above configuration, the lead wire 631U, the lead wire 631V, and the lead wire 631W are disposed at angularly spaced intervals in the circumferential direction. Specifically, the lead wires 631U, 631V, and 631W are disposed at regular angular intervals along the circumference of the axis of rotation 101. With this arrangement, the lead wires 631U, 631V, and 631W serve to prevent the cluster block 621 from moving in the radial direction of the rotary shaft 156.

When assembling the electric compressor 100, the cluster block 621 is first mounted to the electric motor 131, and then the electric motor 131 having the cluster block 621 mounted thereto is assembled to the housing 111. According to the present embodiment in which the lead wires 631U, 631V, and 631W prevent the cluster block 621 from moving radially, there is no need of providing an additional mechanism for preventing the cluster block 621, so that the electric compressor 100 is made simple and the efficiency of assembling the electric compressor 100 is enhanced.

Figure 5:
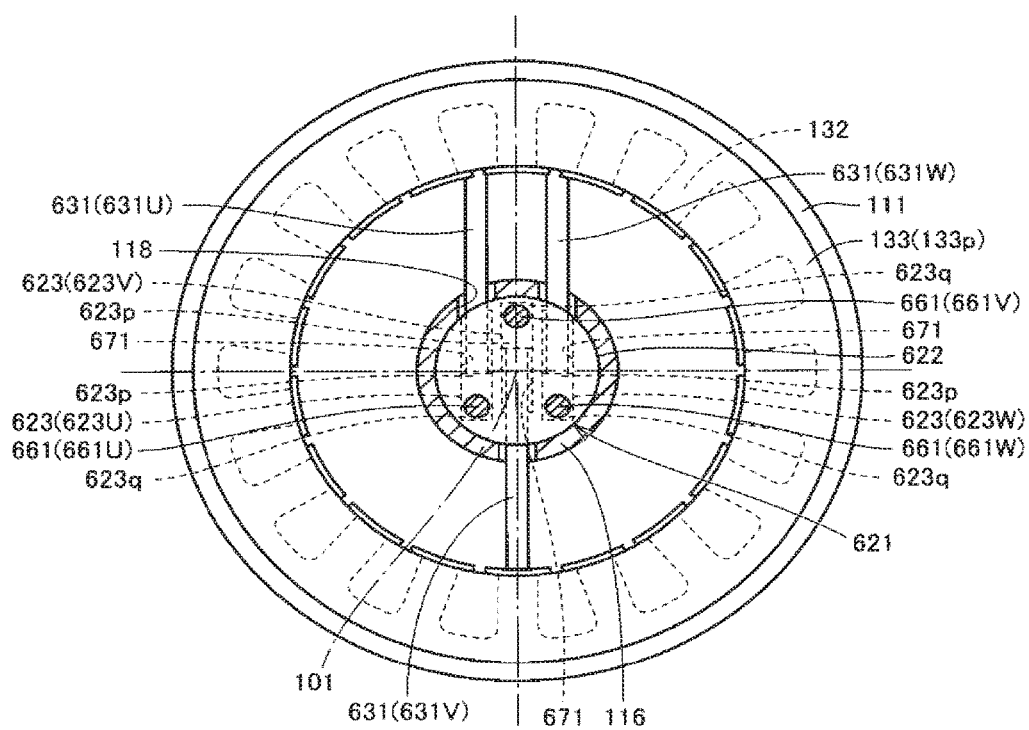
FIG. 5 is a cross-sectional view of a second modification of the structure in that movement of a cluster block is restricted according to the embodiment of the present invention.

FIG. 5 is a cross-sectional view of a second modification of the structure that prevents the movement of the cluster block. According to the present embodiment, the lead wire 631U, the lead wire 631V, and the lead wire 631W are disposed at irregular angular intervals in the circumference direction of the boss 116, as shown in FIG. 5.

The interval between the lead wires 631U, 631V, and 631W may be optional, as long as the arrangement of the lead wires 631U, 631V, and 631W prevents the cluster block 621 from moving in the radial direction of the boss 116.

Although, in the embodiment described with reference to FIGS. 1 and 2, the bearing 141 adjacent to the compression mechanism 161 and the bearing 142 adjacent to the inverter 121 are provided, the bearing 142 may be dispensed with as long as the rotary shaft 156 is rotatably supported appropriately by the bearing 141 alone.

In the present embodiment, description has been made as to the electric compressor 100 of an in-line type in which the compression mechanism 161, the electric motor 131, and the inverter 121 are arranged linearly. However, the electric compressor 100 of present invention may be of a camel type in which the inverter 121 is mounted to the peripheral wall 112 of the housing 111.

It is to be noted that the embodiments disclosed herein are examples in all respects and should not be construed as restrictive. The scope of the present invention is to be indicated not by the descriptions that have been made hereinabove, but by the scope of claims, and various modifications may be made within the scope and equivalence of the appended claims.

The present invention is particularly applicable to an electric compressor in having an inverter integrated therewith.

What is claimed is:
1. An electric compressor comprising:
a compression mechanism that compresses refrigerant;
an electric motor that drives the compression mechanism;
a drive circuit that drives the electric motor;
a housing that defines therein a motor chamber in which the electric motor is accommodated;
a cover that is attached to the housing, the cover being configured to cooperate with the housing to form a drive circuit chamber in which the drive circuit is accommodated;
a rotary shaft through which rotation of the electric motor is transmitted to the compression mechanism;
a bearing that rotatably supports the rotary shaft; and
a relay terminal portion that provides electrical connection between a wire of the drive circuit and a wire of the electric motor, wherein
the housing includes a partition wall that separates the motor chamber and the drive circuit chamber from each other,
the relay terminal portion is disposed between the partition wall and the rotary shaft,
the housing includes a boss that extends from the partition wall toward the electric motor,
the bearing is disposed between the boss and the rotary shaft,
the relay terminal portion is disposed between the partition wall and the bearing, and
the relay terminal portion is disposed in an accommodating space that is defined by the partition wall, the rotary shaft, the bearing, and the boss.
2. The electric compressor according to claim 1, wherein the relay terminal portion is provided such that the relay terminal portion is free from contact with the bearing.
3. The electric compressor according to claim 1, wherein the bearing includes an inner race that is in contact with the rotary shaft, an outer race that is in contact with the boss, and rolling elements disposed between the inner race and the outer race, and
the relay terminal portion is in contact with the outer race and the partition wall.
4. The electric compressor according to claim 1, wherein the wire of the electric motor includes a first lead wire, a second lead wire, and a third lead wire, and
the first lead wire, the second lead wire, and the third lead wire are arranged to prevent the relay terminal portion from moving in a radial direction of the rotary shaft.
5. The electric compressor according to claim 1, wherein the electric motor includes a stator core and a coil that is wound about the stator core so as to form a coil end that protrudes from an end surface of the stator core in an axial direction of the rotary shaft, and
the relay terminal portion is disposed at an axial position where at least a part of the relay terminal portion overlaps with the coil end when viewed in a radial direction of the rotary shaft.

\* \* \* \* \*